(12) United States Patent
Wu

(10) Patent No.: US 11,630,384 B1
(45) Date of Patent: Apr. 18, 2023

(54) LIGHT SOURCE MODULE

(71) Applicant: DELTA ELECTRONICS, INC., Taoyuan (TW)

(72) Inventor: Kuo-Tung Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/659,011

(22) Filed: Apr. 13, 2022

(30) Foreign Application Priority Data

Jan. 13, 2022 (CN) .......................... 202210037216.X

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01); *G03B 21/208* (2013.01); *G03B 21/2066* (2013.01)

(58) Field of Classification Search
CPC .............. G03B 21/204; G03B 21/2066; G03B 21/208; G02B 26/008
See application file for complete search history.

(56) References Cited

U.S. PATENT DOCUMENTS 10,732,495 B2 * 8/2020 Hsieh ..................... G03B 33/08
2009/0268168 A1 * 10/2009 Wang ................. G03B 21/2066
353/30

2014/0160441 A1 * 6/2014 Kim ......................... F21V 9/08
353/31
2015/0316775 A1 * 11/2015 Hsieh ................. G03B 21/2013
353/31
2020/0192114 A1 * 6/2020 Chen .................. G03B 21/2066

FOREIGN PATENT DOCUMENTS

| CN | 209373339 U | 9/2019 |
|----|----|----|
| CN | 110967902 A | 4/2020 |
| CN | 109270703 B | 3/2021 |
| CN | 109557750 B | 6/2021 |
| CN | 113311655 A | 8/2021 |
| TW | I704381 B | 9/2020 |

OTHER PUBLICATIONS

Machine translation of Ge et al. CN 110967902 B. published Dec. 22, 2020 (Year: 2020).*

* cited by examiner

*Primary Examiner* — William N Harris

(74) *Attorney, Agent, or Firm* — CKC & Partners Co., LLC

(57) ABSTRACT

A light source module includes a light source, a wavelength conversion unit, a diffuser, and a reflector. The light source is configured to emit excitation light. The wavelength conversion unit is configured to reflect the excitation light. The diffuser has a first side and a second side opposite to each other, and is configured to allow the excitation light reflected by the wavelength conversion unit to enter the diffuser from the first side and reach the second side. The reflector is configured to reflect the excitation light entering the diffuser, so that the excitation light propagates from the second side to the first side and leaves the diffuser.

12 Claims, 6 Drawing Sheets

LIGHT SOURCE MODULE

CROSS-REFERENCE TO RELATED APPLICATION

This application claims priority to China Application Serial Number 202210037216.X, filed Jan. 13, 2022, which is herein incorporated by reference.

BACKGROUND

Technical Field

The present disclosure relates to a light source module.

Description of Related Art

In recent years, laser light has attracted attention as a light source of projection-type image display devices. Laser light sources have several advantages. First, the laser light emitted from the laser light source has excellent directivity and thus has high optical utility. In addition, the laser light is monochromatic, so the color reproduction area can be enlarged. Laser light sources also feature low power consumption and long life compared to other light sources such as incandescent light bulbs.

When coherent light, such as laser light, is incident on a rough surface (e.g., transmissive or reflective screen) with a roughness greater than the wavelength of the laser light, a mottled light pattern called a "speckle pattern" or simply "speckle" is produced. More specifically, a single wavelength of light scattered at each point on the rough surface overlaps irregularly at each point on the viewing surface to create a complex interference pattern.

In order to eliminate the aforementioned speckle, a conventional technique utilizes a diffuser to homogenize the laser light. However, the conventional technique has at least the following shortcomings: (1) when the space is limited, it is necessary to increase the inclination angle of the diffuser, but at the same time, the efficiency may be degraded; and (2) when there is a cost consideration, the number of diffusers must be reduced, but the effect of eliminating speckles is weakened, and the rendered image is uneven.

Accordingly, how to provide a light source module that can solve the aforementioned problems becomes an important issue to be solved by those in the industry.

SUMMARY

An aspect of the disclosure is to provide a light source module that can efficiently solve the aforementioned problems.

According to an embodiment of the disclosure, a light source module includes a light source, a wavelength conversion unit, a diffuser, and a reflector. The light source is configured to emit excitation light. The wavelength conversion unit is configured to reflect the excitation light. The diffuser has a first side and a second side opposite to each other, and is configured to allow the excitation light reflected by the wavelength conversion unit to enter the diffuser from the first side and reach the second side. The reflector is configured to reflect the excitation light entering the diffuser, so that the excitation light propagates from the second side to the first side and leaves the diffuser. The reflector is disposed on and in contact with the second side of the diffuser.

In an embodiment of the disclosure, the light source module further includes a dichroic sheet. The dichroic sheet is located between the wavelength conversion unit and the diffuser. The wavelength conversion unit is further configured to convert the excitation light into excited light. The dichroic sheet is configured to transmit the excitation light and reflect the excited light.

In an embodiment of the disclosure, the light source module further includes a color wheel. The color wheel is configured to transmit the excitation light leaving the diffuser from the first side and the excited light reflected by the dichroic sheet.

In an embodiment of the disclosure, the light source module further includes an integration rod. The integration rod is configured to receive the excitation light and the excited light passing through the color wheel.

In an embodiment of the disclosure, the light source module further includes another diffuser. The another diffuser is configured to transmit the excitation light leaving the diffuser from the first side and the excited light reflected by the dichroic sheet.

In an embodiment of the disclosure, the light source module further includes an integration rod. The integration rod is configured to receive the excitation light and the excited light passing through the another diffuser.

In an embodiment of the disclosure, the light source module further includes a lens. The lens has an optical axis. The excitation light emitted by the light source reaches the wavelength conversion unit through the lens along a path deviated from the optical axis.

In an embodiment of the disclosure, the light source module further includes another diffuser. The another diffuser is optically coupled between the light source and the wavelength conversion unit.

According to an embodiment of the disclosure, a light source module includes a light source, a wavelength conversion unit, a diffuser, and a reflector. The light source is configured to emit excitation light. The wavelength conversion unit is configured to reflect the excitation light. The diffuser has a first side and a second side opposite to each other, and is configured to allow the excitation light reflected by the wavelength conversion unit to enter the diffuser from the first side and reach the second side. The reflector is configured to reflect the excitation light entering the diffuser, so that the excitation light propagates from the second side to the first side and leaves the diffuser. A gap is formed between the diffuser and the reflector.

Accordingly, in the light source module of the present disclosure, the reflector can reflect the excitation light that enters the diffuser from the first side of the diffuser and reaches the second side of the diffuser, so that the excitation light propagates from the second side to the first side and leaves the diffuser. In other words, the excitation light passes through the diffuser twice. In this way, the light source module of the present disclosure can eliminate the speckle generated by the excitation light with a small number of diffusers.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
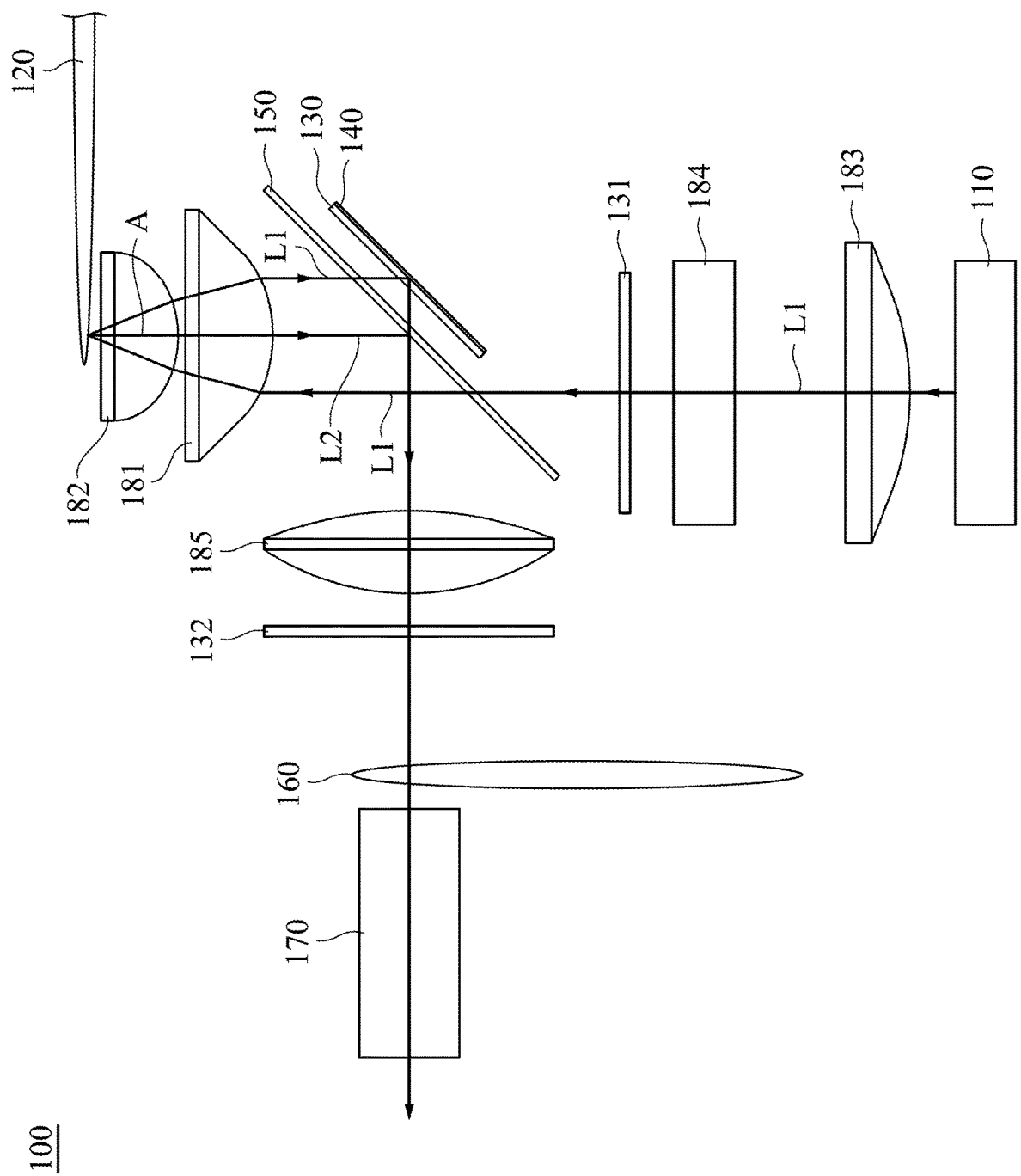
FIG. 1 is a schematic diagram of a light source module according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a light source module 100 according to an embodiment of the present disclosure. As shown in FIG. 1, in the present embodiment, the light source module 100 may be applied to, for example, a three-chip digital light processing (DLP) projector, but the present disclosure is not limited in this regard. The light source module 100 includes a light source 110, a wavelength conversion unit 120, diffusers 130, 131, 132, a reflector 140, a dichroic sheet 150, a color wheel 160, an integration rod 170, and lenses 181, 182, 183, 184, 185. The light source 110 is configured to emit excitation light L1. In some embodiments, the light source 110 is a blue laser solid-state light source, so the excitation light L1 is a blue laser light, but the disclosure is not limited in this regard. The lenses 181, 182, 183, 184, 185 are configured to adjust the light shape according to the requirements. The lenses 183, 184, the diffuser 131, the dichroic sheet 150, and the lenses 181, 182 are sequentially optically coupled to the wavelength conversion unit 120 from the light source 110. That is, the excitation light L1 emitted by the light source 110 will sequentially pass through the lenses 183, 184, the diffuser 131, the dichroic sheet 150, and the lenses 181, 182 to reach the wavelength conversion unit 120. From this, it can be seen that the dichroic sheet 150 is configured to transmit the excitation light L1. The wavelength conversion unit 120 is configured to reflect the excitation light L1. Specifically, the lenses 181, 182 have an optical axis A. The excitation light L1 emitted by the light source 110 reaches the wavelength conversion unit 120 through the lenses 181, 182 along a path deviated from the optical axis A. The excitation light L1 reflected by the wavelength conversion unit 120 will sequentially pass through the lenses 182, 181 and the dichroic sheet 150 to reach the diffuser 130 along another path deviated from the optical axis A.

In some embodiments, the excitation light L1 is transmitted from the light source 110 to the wavelength conversion unit 120 directly without passing through the dichroic sheet 150.

Figure 2:
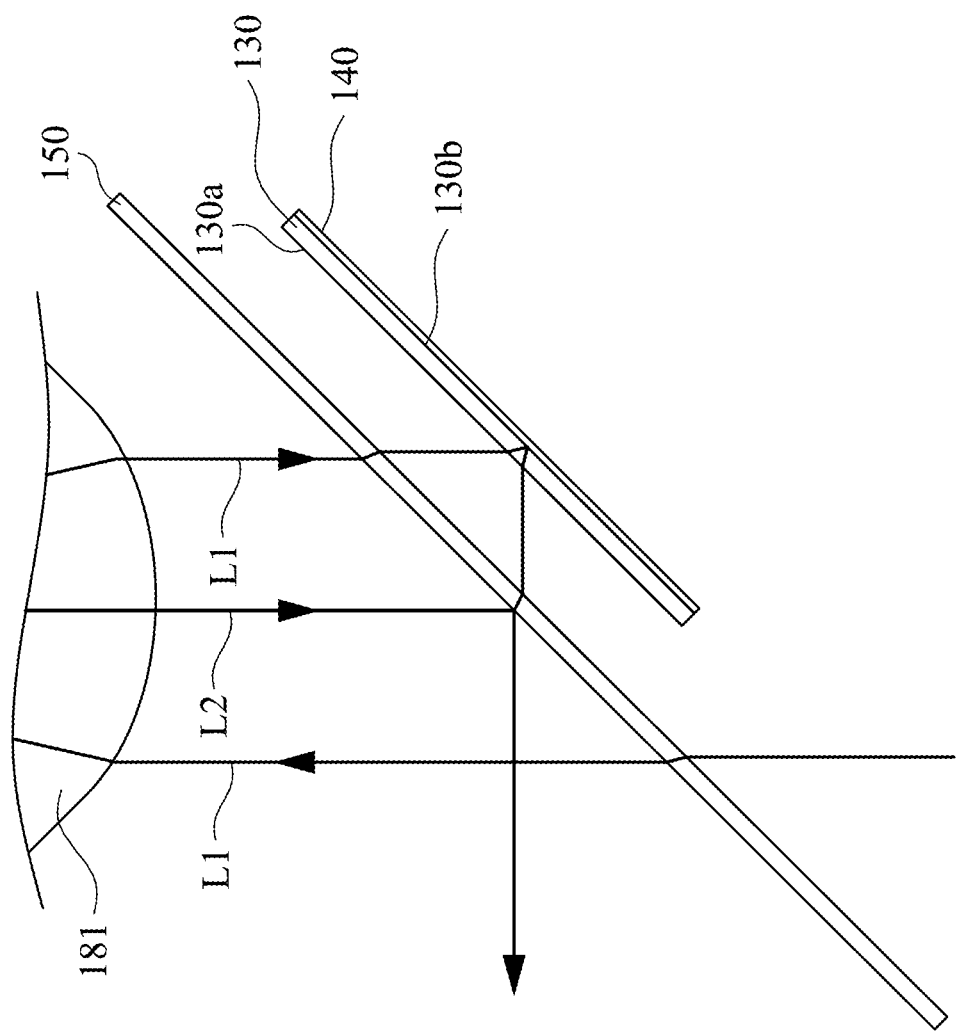
FIG. 2 is a schematic diagram of some components of the light source module in FIG. 1.

Reference is made to FIG. 2. FIG. 2 is a schematic diagram of some components of the light source module 100 in FIG. 1. As shown in FIG. 2, in the present embodiment, the diffuser 130 has a first side 130a and a second side 130b opposite to each other, and is configured to allow the excitation light L1 reflected by the wavelength conversion unit 120 to enter the diffuser 130 from the first side 130a and reach the second side 130b. The reflector 140 is disposed on and in contact with the second side 130b of the diffuser 130, and is configured to reflect the excitation light L1 entering the diffuser 130, so that the excitation light L1 propagates from the second side 130b to the first side 130a and leaves the diffuser 130.

As can be seen from the aforementioned structural configurations, the reflector 140 can reflect the excitation light L1 that enters the diffuser 130 from the first side 130a of the diffuser 130 and reaches the second side 130b of the diffuser 130, so that the excitation light L1 propagates from the second side 130b to the first side 130a and leaves the diffuser 130. In other words, the excitation light L1 passes through the diffuser 130 twice. In this way, the light source module 100 of the present embodiment can enhance the effect of eliminating the speckle generated by the excitation light L1 by the combination of the diffuser 130 and the reflector 140.

In some embodiments, the reflector 140 is a reflective coating disposed on the second side 130b of the diffuser 130, so the reflector 140 does not occupy the internal space of the light source module 100, but the present disclosure is not limited in this regard.

Figure 3:
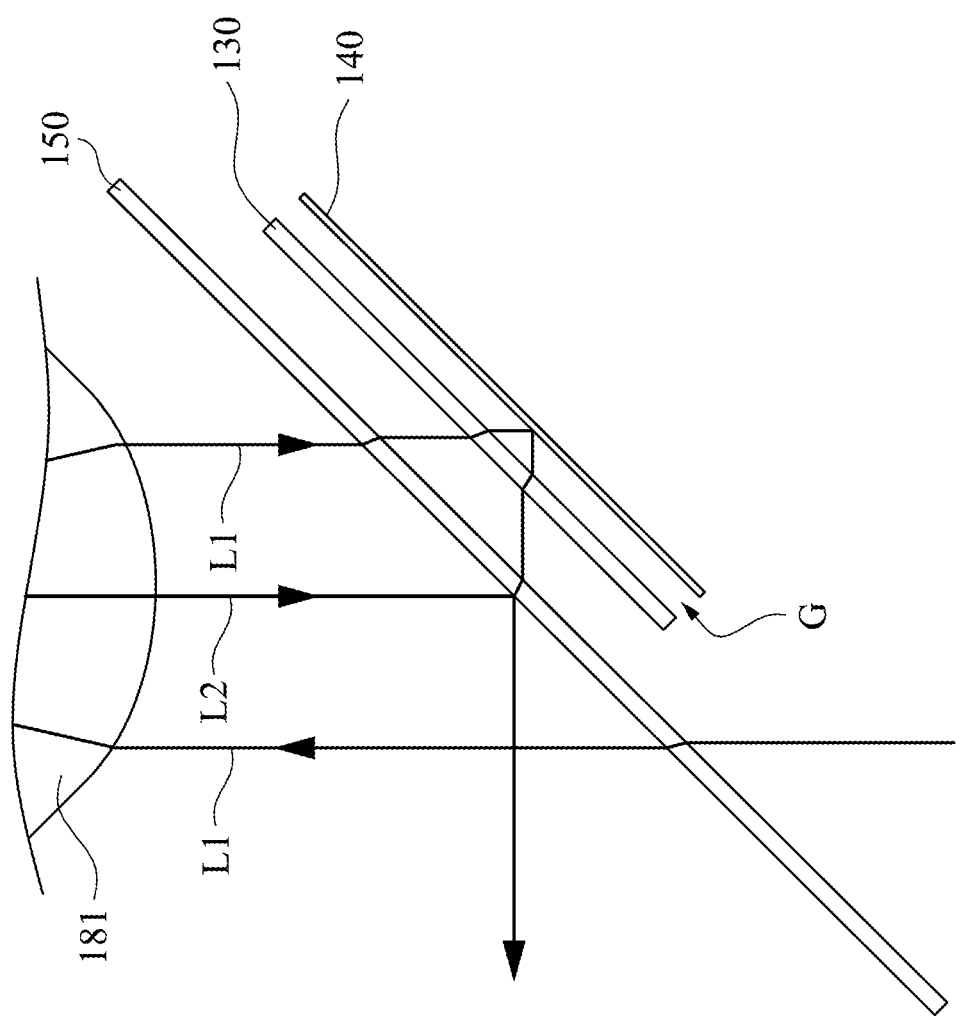
FIG. 3 is a schematic diagram of some components of the light source module according to another embodiment of the present disclosure.

Reference is made to FIG. 3. FIG. 3 is a schematic diagram of some components of the light source module 100 according to another embodiment of the present disclosure. As shown in FIG. 3, in the present embodiment, a gap G is formed between the diffuser 130 and the reflector 140. After the excitation light L1 entering the diffuser 130 reaches the second side 130b, it will leave the diffuser 130 from the second side 130b and reach the reflector 140 through the gap G. The reflector 140 will reflect the excitation light L1 back to the diffuser 130, and the excitation light L1 enters the diffuser 130 from the second side 130b and leave the diffuser 130 from the first side 130a.

Figure 4:
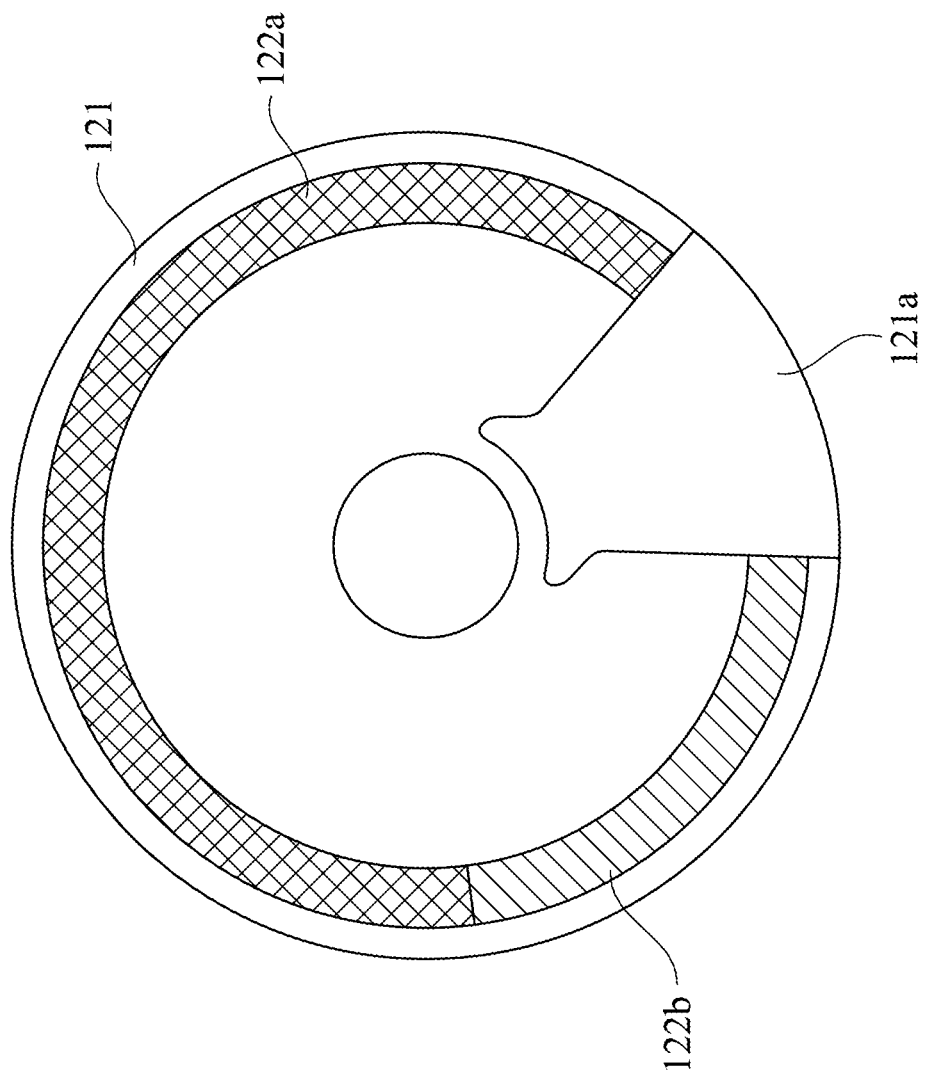
FIG. 4 is a front view of a wavelength conversion unit in FIG. 1.

Reference is made FIG. 4. FIG. 4 is a front view of the wavelength conversion unit 120 in FIG. 1. As shown in FIG. 4, in the present embodiment, the wavelength conversion unit 120 is further configured to convert the excitation light L1 into excited light L2. The dichroic sheet 150 is further configured to reflect the excited light L2. In detail, the wavelength conversion unit 120 includes a base plate 121 and a plurality of phosphor blocks 122a, 122b disposed on the base plate 121. The base plate 121 is in the shape of a disc, and the center of the base plate 121 can be connected with a rotating shaft of a motor (not shown), so as to be rotated by the motor. The base plate 121 includes a reflection portion 121a. The phosphor blocks 122a, 122b and the reflection portion 121a are arranged on the front surface of the base plate 121 along a circular path around the center of the base plate 121. The excitation light L1 emitted by the light source 110 forms a light spot on the base plate 121. During the rotation of the base plate 121, the light spot will sequentially move on the phosphor blocks 122a, 122b and the reflection portion 121a along the aforementioned circular path. When the base plate 121 is rotated and the light spot is located on the reflection portion 121a, the reflection portion 121a will reflect the excitation light L1. When the base plate 121 is rotated and the light spot is located on one of the phosphor blocks 122a, 122b, the excitation light L1 will be converted into the excited light L2. The excited light L2 propagates with some angle from the base plate 121 to the dichroic sheet 150 and is reflected by the dichroic sheet 150.

For example, the phosphor block 122a is a yellow phosphor block, and the excited light L2 is yellow light; the phosphor block 122b is a green phosphor block, and the excited light L2 is green light, but the disclosure is not limited in this regard.

As shown in FIGS. 1 and 2, in the present embodiment, the dichroic sheet 150 is located between the wavelength conversion unit 120 and the diffuser 130. The excitation light L1 reflected by the wavelength conversion unit 120 will first pass through the dichroic sheet 150 to reach the diffuser 130, and then be reflected by the reflector 140 and pass through the dichroic sheet 150 again. The excitation light L1 reflected by the reflector 140 and passing through the dichroic sheet 150 and the excited light L2 reflected by the dichroic sheet 150 propagate to the integration rod 170 sequentially through the lens 185, the diffuser 132, and the color wheel 160 along the same optical path.

Figure 5:
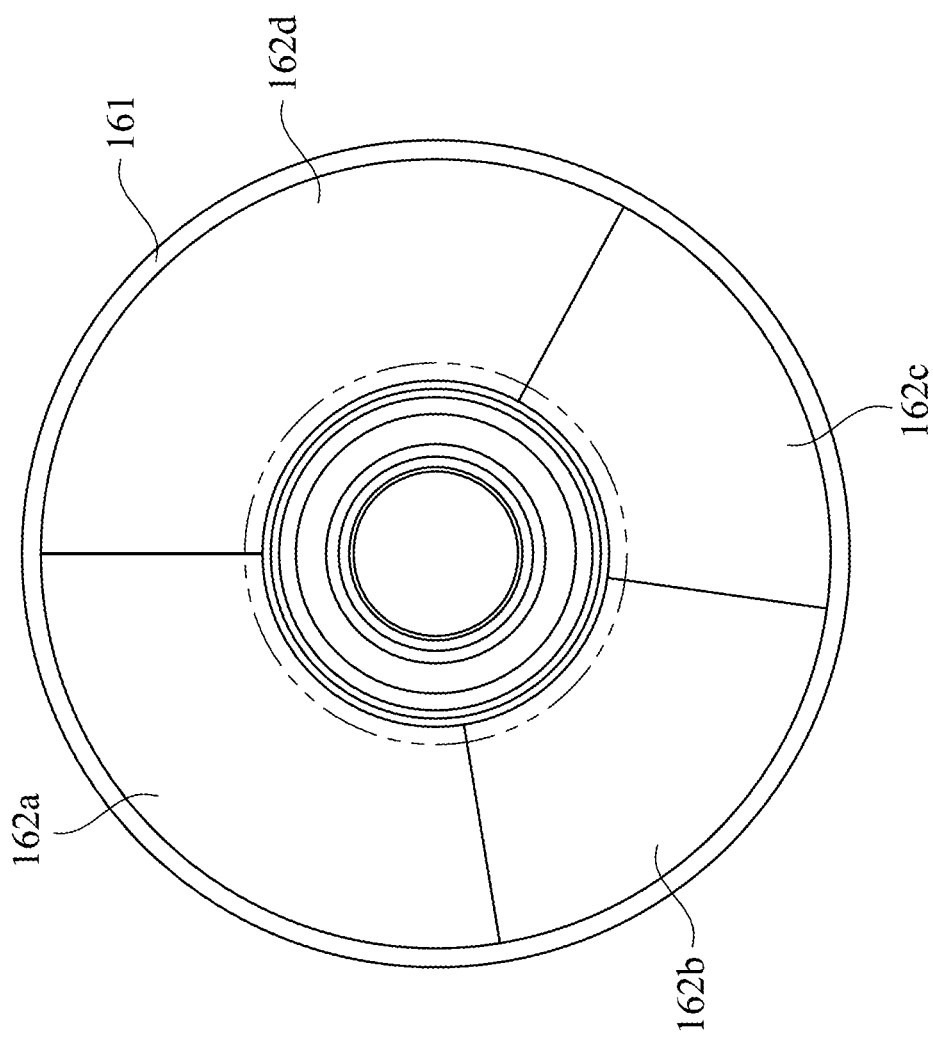
FIG. 5 is a front view of a color wheel in FIG. 1.

Reference is made to FIG. 5. FIG. 5 is a front view of the color wheel 160 in FIG. 1. As shown in FIG. 5, in the present embodiment, the color wheel 160 is configured to transmit the excitation light L1 leaving the diffuser 130 from the first side 130a and the excited light L2 reflected by the dichroic sheet 150. The integration rod 170 is configured to receive the excitation light L1 and the excited light L2 passing through the color wheel 160. The color wheel 160 includes a base plate 161 and filters 162a, 162b, 162c, 162d disposed thereon. The base plate 161 is in the shape of a disc, and the center of the base plate 161 can be connected with the rotating shaft of another motor (not shown), so as to be rotated by the motor. The filters 162a, 162b, 162c, 162d are arranged on the front surface of the base plate 161 around the center of the base plate 161. During the rotation of the base plate 161, the excitation light L1 or the excited light L2 will sequentially pass through the filters 162a, 162b, 162c, 162d.

For example, the filters 162a, 162b, 162c, 162d are respectively a red color filter, a green color filter, a blue color filter, and a yellow color filter, but the present disclosure is not limited in this regard. With the cooperation of the wavelength conversion unit 120 and the color wheel 160, the desired color light can be filtered out from the excitation light L1 and the excited light L2.

According to the aforementioned structural configurations, since the combination of the diffuser 130 and the reflector 140 enhances the effect of eliminating the speckle generated by the excitation light L1, at least one of the diffusers 131, 132 of the light source module 100 of the present disclosure can be further considered to be omitted.

Figure 6:
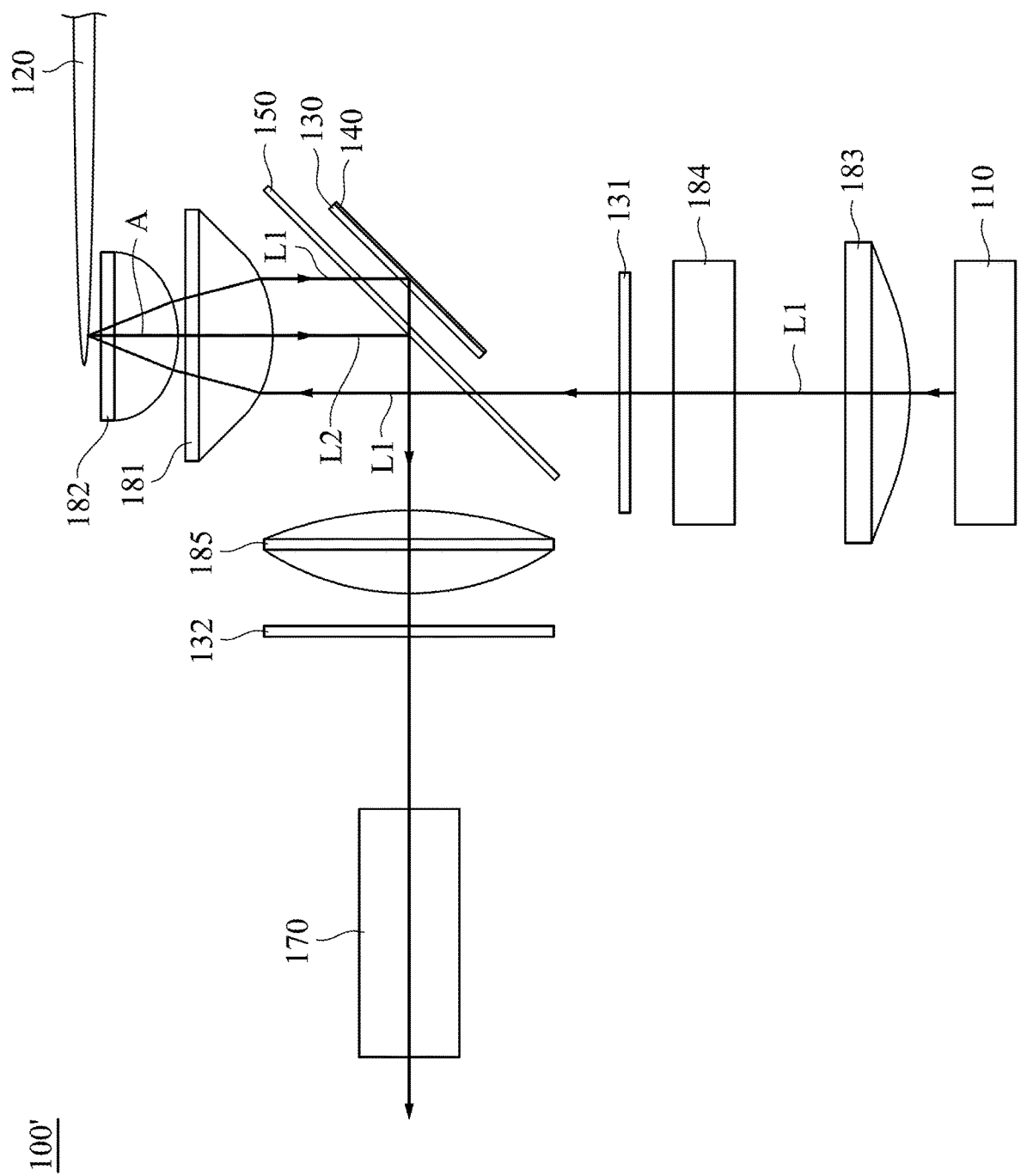
FIG. 6 is a schematic diagram of a light source module according to another embodiment of the present disclosure.

In some embodiments, if the excited light L2 converted by the wavelength conversion unit 120 is already a desired color light, the color wheel 160 may be omitted. Reference is made to FIG. 6. FIG. 6 is a schematic diagram of a light source module 100' according to another embodiment of the present disclosure. The difference between the present embodiment and the embodiment shown in FIG. 1 is that the light source module 100' of the present embodiment omits the color wheel 160.

According to the foregoing recitations of the embodiments of the disclosure, it can be seen that in the light source module of the present disclosure, the reflector can reflect the excitation light that enters the diffuser from the first side of the diffuser and reaches the second side of the diffuser, so that the excitation light propagates from the second side to the first side and leaves the diffuser. In other words, the excitation light passes through the diffuser twice. In this way, the light source module of the present disclosure can eliminate the speckle generated by the excitation light with a small number of diffusers.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light source module, comprising:
   a light source configured to emit excitation light;
   a wavelength conversion unit configured to reflect the excitation light;
   a diffuser having a first side and a second side opposite to each other, and configured to allow the excitation light reflected by the wavelength conversion unit to enter the diffuser from the first side and reach the second side;
   a reflector configured to reflect the excitation light entering the diffuser, so that the excitation light propagates from the second side to the first side and leaves the diffuser, wherein the reflector is disposed on and in contact with the second side of the diffuser;
   a dichroic sheet located between the wavelength conversion unit and the diffuser, wherein the wavelength conversion unit is further configured to convert the excitation light into excited light, and the dichroic sheet is configured to transmit the excitation light and reflect the excited light; and
   another diffuser configured to transmit the excitation light leaving the diffuser from the first side and the excited light reflected by the dichroic sheet.

2. The light source module of claim 1, further comprising a color wheel, wherein the color wheel is configured to transmit the excitation light leaving the diffuser from the first side and the excited light reflected by the dichroic sheet.

3. The light source module of claim 2, further comprising an integration rod, wherein the integration rod is configured to receive the excitation light and the excited light passing through the color wheel.

4. The light source module of claim 1, further comprising an integration rod, wherein the integration rod is configured to receive the excitation light and the excited light passing through the another diffuser.

5. The light source module of claim 1, further comprising a lens, wherein the lens has an optical axis, and the excitation light emitted by the light source reaches the wavelength conversion unit through the lens along a path deviated from the optical axis.

6. The light source module of claim 1, further comprising a third diffuser, wherein the third diffuser is optically coupled between the light source and the wavelength conversion unit.

7. A light source module, comprising:
a light source configured to emit excitation light;
a wavelength conversion unit configured to reflect the excitation light;
a diffuser having a first side and a second side opposite to each other, and configured to allow the excitation light reflected by the wavelength conversion unit to enter the diffuser from the first side and reach the second side;
a reflector configured to reflect the excitation light entering the diffuser, so that the excitation light propagates from the second side to the first side and leaves the diffuser, wherein a gap is formed between the diffuser and the reflector;
a dichroic sheet located between the wavelength conversion unit and the diffuser, wherein the wavelength conversion unit is further configured to convert the excitation light into excited light, and the dichroic sheet is configured to reflect the excited light and transmit the excitation light; and
another diffuser configured to transmit the excitation light leaving the diffuser from the first side and the excited light reflected by the dichroic sheet.

8. The light source module of claim 7, further comprising a color wheel, wherein the color wheel is configured to transmit the excitation light leaving the diffuser from the first side and the excited light reflected by the dichroic sheet.

9. The light source module of claim 8, further comprising an integration rod, wherein the integration rod is configured to receive the excitation light and the excited light passing through the color wheel.

10. The light source module of claim 7, further comprising an integration rod, wherein the integration rod is configured to receive the excitation light and the excited light passing through the another diffuser.

11. The light source module of claim 7, further comprising a lens, wherein the lens has an optical axis, and the excitation light emitted by the light source reaches the wavelength conversion unit through the lens along a path deviated from the optical axis.

12. The light source module of claim 7, further comprising a third diffuser, wherein the third diffuser is optically coupled between the light source and the wavelength conversion unit.

* * * * *